(12) United States Patent
Zehler

(10) Patent No.: US 10,841,735 B1
(45) Date of Patent: Nov. 17, 2020

(54) PROXIMITY BASED SHARED CONFIGURATION OF SYSTEMS AND DEVICES

(71) Applicant: Xerox Corporation, Norwalk, CT (US)

(72) Inventor: Peter J. Zehler, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 16/250,809

(22) Filed: Jan. 17, 2019

(51) Int. Cl.
    *H04W 4/50*     (2018.01)
    *H04W 4/02*     (2018.01)
    *G06F 16/28*     (2019.01)
    *F24F 11/62*     (2018.01)

(52) U.S. Cl.
    CPC .......... *H04W 4/023* (2013.01); *G06F 16/285* (2019.01); *H04W 4/50* (2018.02); *F24F 11/62* (2018.01)

(58) Field of Classification Search
    CPC ........... H04W 4/02; H04W 8/18; H04W 4/80; H04W 4/16
See application file for complete search history.

(56) References Cited

U.S. PATENT DOCUMENTS

| | | |
|---|---|---|
| 9,769,863 B2 | 9/2017 | Jamal-Syed et al. |
| 2006/0199715 A1 | 9/2006 | Leon |
| 2019/0082293 A1* | 3/2019 | Rifkin .................. H04W 4/021 |

* cited by examiner

*Primary Examiner* — Sam Bhattacharya
(74) *Attorney, Agent, or Firm* — Fay Sharpe LLP

(57) ABSTRACT

Systems and methods for adapting a service provided based on a local taxonomy defining a local community of individuals are disclosed. The systems and methods involve a close proximity protocol used to detect and/or communicate with various mobile devices located within a certain range of a site location, and include a device that requests information from the mobile devices and a device that provides a service to the one or more users within range of the service-providing device. A local taxonomy is generated and evolved based on the dynamics of the local community of individuals (i.e. as individuals enter and exit the range of the system), and the service(s) provided is adapted as the local taxonomy changes.

15 Claims, 4 Drawing Sheets

PROXIMITY BASED SHARED CONFIGURATION OF SYSTEMS AND DEVICES

BACKGROUND

The exemplary embodiment relates to adaptive configuration of systems and devices based on the proximity of users, and finds particular application in a system and method for adapting a service provided by a service-providing device based on a generated local taxonomy defined by information associated with one or more proximate individuals.

Many systems and devices provide services to individuals within a limited range or proximity, but remain unaware of the changing dynamics and preferences of those individuals without the directed action of those individuals. In other words, these systems and devices that provide a service to a community of people have no direct knowledge of the current environment. As a result, these services provided to those individuals and groups of people are unable to meet the needs or desires of those communities.

As a result, there is a need for a system and method for adapting a service provided by a variety of systems and devices based on the needs and preferences of individuals and groups of people located within a close proximity to such systems and devices.

INCORPORATION BY REFERENCE

U.S. Pat. No. 9,769,863, by Jamal-Syed et al., issued Sep. 19, 2017 and entitled "Music Playlist Application"; and U.S. Patent Publication No. 2006/0199715, by Leon, published Sep. 7, 2006 and entitled "System and Method for Implementing a Physical Fitness Regimen with Color Healing", are incorporated herein by reference in their entirety.

BRIEF DESCRIPTION

In accordance with one aspect of the exemplary embodiment, a system for dynamically adapting a service based on a local taxonomy is provided. The system includes an information-requesting device disposed at a site, which requests information related to users near the site, and a service-providing device, which provides a service that is adapted based on the information related to said users. The information-requesting device includes a proximity module capable of detecting and communicating with one or more mobile devices associated with individuals located within at least a first proximity to the site, a request component capable of requesting and receiving sharable user information from the mobile devices, a local taxonomy generator that generates a local taxonomy based on the sharable user information received from the local mobile devices, and an output component configured to output the local taxonomy to the service-providing device. The information-requesting device can comprise a processor which implements one or more of the components and generators of the device, and a memory device which stores the sharable user information, the local taxonomy, and instructions for implementing the various components.

Further, the service-providing device provides a service to at least one of the users associated with the one or more mobile devices located within at least the first proximity to the site, and the service is adapted based on the local taxonomy.

In particular embodiments, a master taxonomy is defined by a plurality of user-information categories, and the local taxonomy is defined by a sub-set of the plurality of user-information categories based on the sharable user information received from the one or more proximate mobile devices.

In accordance with another aspect of the exemplary embodiment, the system includes one or more mobile devices having an information-sharing component capable of communicating with the information-requesting device to send user information associated with the mobile device. The information-sharing component can comprise an information privacy component configured to determine whether user information associated with the mobile device is sharable user information or private user information, and selectively share with the information-requesting device only the sharable user information.

In accordance with still another aspect of the exemplary embodiment, a method is provided for adapting a service provided by a service-providing device based on a local taxonomy. The method includes the steps of: deploying an information-requesting device and the service-providing device at a site; detecting one or more mobile devices located within at least a first proximity to the site; requesting sharable user information from the one or more mobile devices located within at least the first proximity to the site; generating a local taxonomy of user information based on the sharable user information received from the one or more mobile devices; and modifying the service provided by the service-providing device based on the local taxonomy.

DETAILED DESCRIPTION

A system and method are described which adaptively modify a service provided by a device in response to the collection and classification of information from one or more mobile devices of users located within a certain distance of the device providing the service.

As used herein, the term "taxonomy" is considered to include any organization of data that describes, for each user, the particular user's preferences for the use of a service. For example, a user may prefer to have prints made on a printer in color, double-sided, and stapled. The preference data would then include those data as part of the taxonomy.

Figure 1:
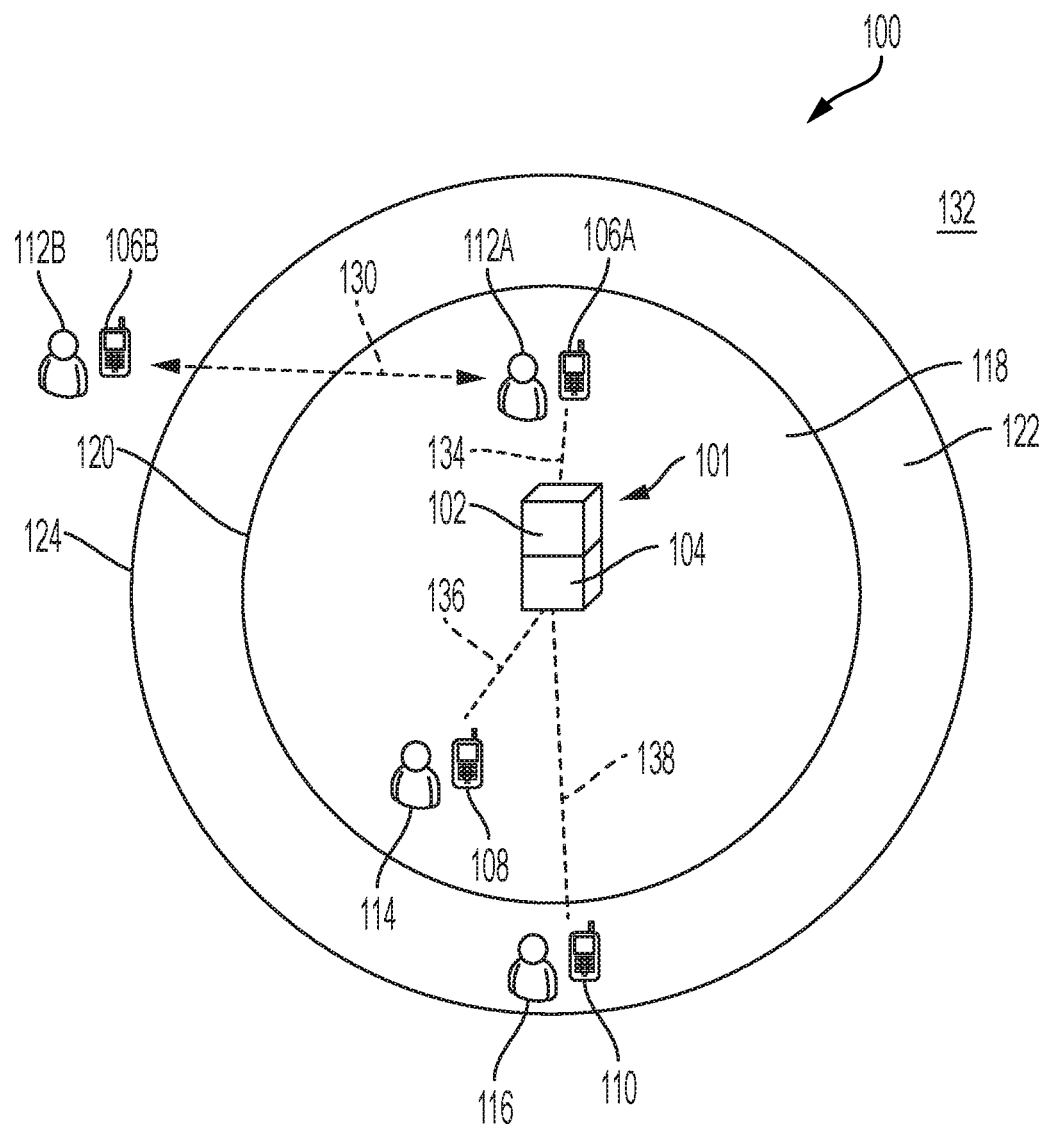
FIG. 1 is an illustration of a system for dynamically adapting the service provided by a service-providing device based on a local taxonomy defined by user information collected from a plurality of mobile devices associated with said users located within at least a first proximity to a deployment site.
Figure 2:
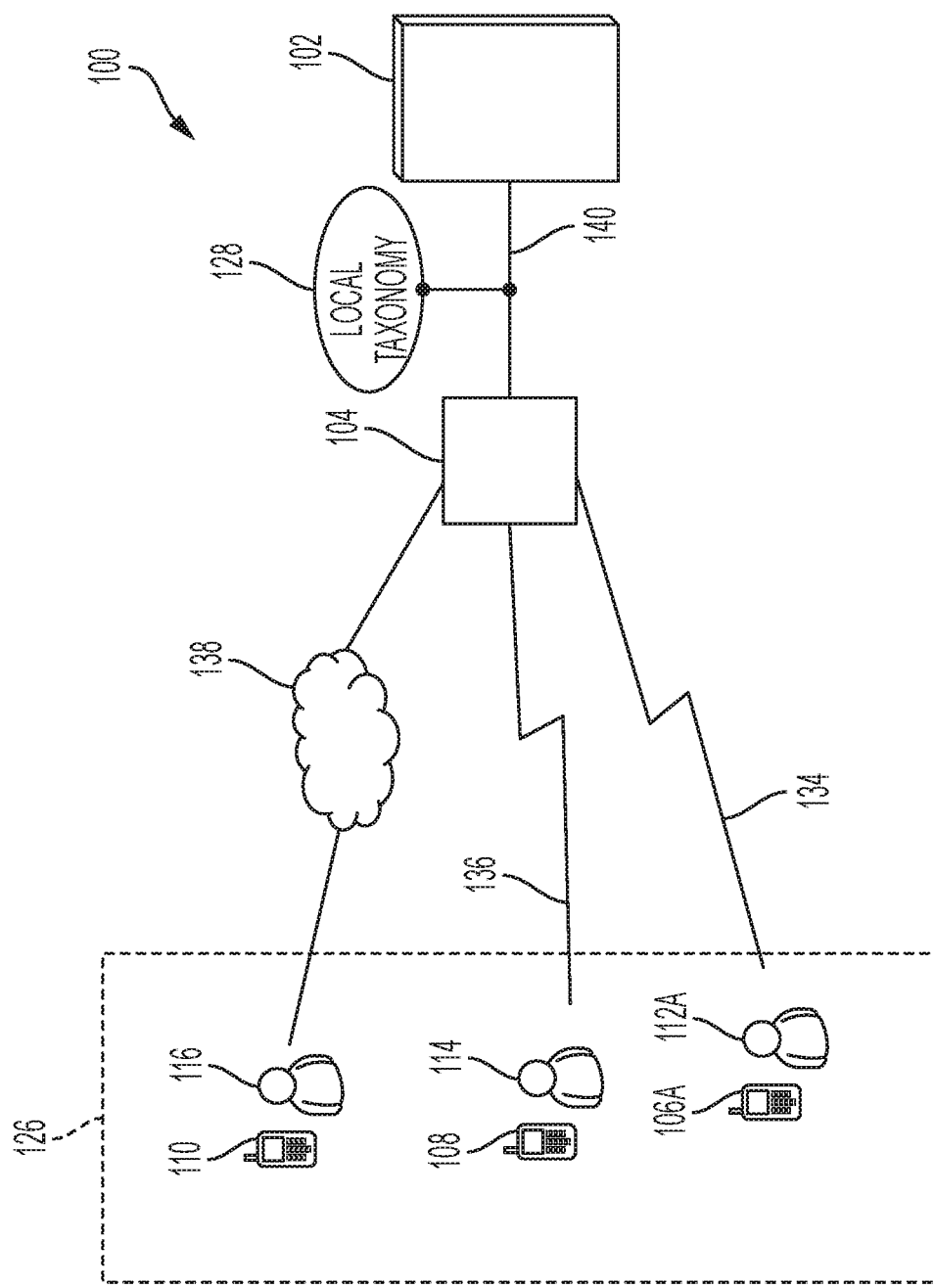
FIG. 2 is a diagram illustrating the various components of the system of FIG. 1.

With reference to FIGS. 1 and 2, various components of a system 100 for adaptively modifying a service provided by a device 102 based on the generation of a local taxonomy is illustrated. The system 100 includes a service-providing device 102, and an information-requesting device 104. The service-providing device 102 and the information-requesting device 104 can be located (i.e. deployed) at a site 101.

In preferred embodiments, the information-requesting device 104 requests user information from one or more mobile devices 106, 108, 110, each mobile device associated with a corresponding user 112A, 114, 116. One or more users 112A, 114, 116 and their associated mobile devices 106, 108, 110 may be located within at least a first proximity to the information-requesting device 104. For example, as seen in FIG. 1, users 112A, 114 and their associated mobile devices 106, 108 are located within a first proximity 118 to the information-requesting device 104, which is defined by an outer perimeter 120.

Additional users may exist within one or more additional proximities to the information-requesting device 104 as well. For example, user 116 and the associated mobile device 110 is located within a second proximity 122, which is defined by an outer perimeter 124. The users 106, 108, 110 located within one or more proximities to the site 101 form a local community of users 126. As discussed further below, the information-requesting device 104 detects the mobile devices 106, 108, 110 of the users 112A, 114, 116 of this community of users 126 to generate a local taxonomy of user information 128, which is then communicated to the service-providing device 102 (e.g. via a wireless or wired connection 140) and used by the service-providing device 102 to adapt the service it provides to one or more users in the community 126.

In particular embodiments, the community of users 126 changes over time as users enter and exit the one or more proximate zones near the site 101. For example, as seen in FIG. 1, user 112A and the associated mobile device 106A leaves the first and second proximate zones 118, 122 along arrow 130 to a zone 132. In some embodiments, the zone 132 is outside the proximate zones 118, 122 such that the information-requesting device 104 can no longer detect or request information from such users. In other words, user 112A is located within at least a first proximity 118 to the information-requesting device 104 and may be included in the generation of the local taxonomy 128 based on user information from the community 126 of users, but user 112B and their associated out-of-range device 106B is no longer a part of the community 126 of users. As a result, the local taxonomy 128 is dynamically updated as one or more users enter and exit the at least a first proximity 118 to the site 101.

In particular embodiments, the information-requesting device 104 and the one or more mobile devices 106A, 108, 110 communicate via connections 134, 136, 138 to send and receive information, such as sharable user information. In some embodiments, the connections 134, 136, 138 are established via a close proximity protocol. The close proximity protocol may be, for example, a Bluetooth low energy (BLE) connection 134, 136. However, other wireless personal area network connections 138 are contemplated, such as Wi-Fi Direct and NFC.

In preferred embodiments, the service-providing device 102 provides a service to at least one of the one or more users located within at least the first proximity 118 to the site 101. The service provided is adapted to best meet the needs of the local community 126 of users 112A, 114, 116 based on the local taxonomy 128 of user information generated by the information-requesting device 104. Further, the service provided is dynamically adapted as users enter and exit at least the first proximity 118 of the site 101.

Figure 3:
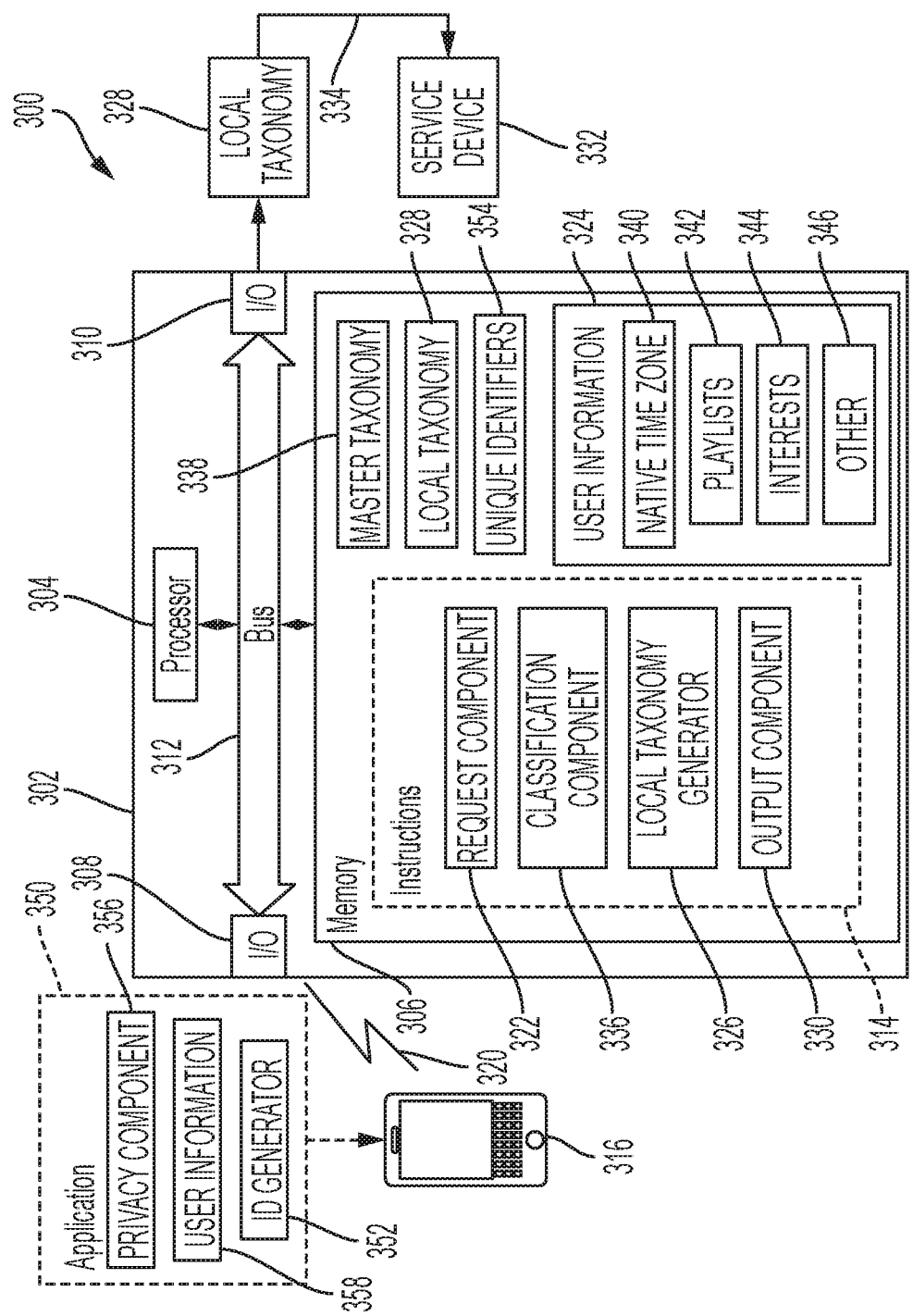
FIG. 3 is a functional block diagram of a system for dynamically adapting the service provided by a service-providing device.
Figure 4:
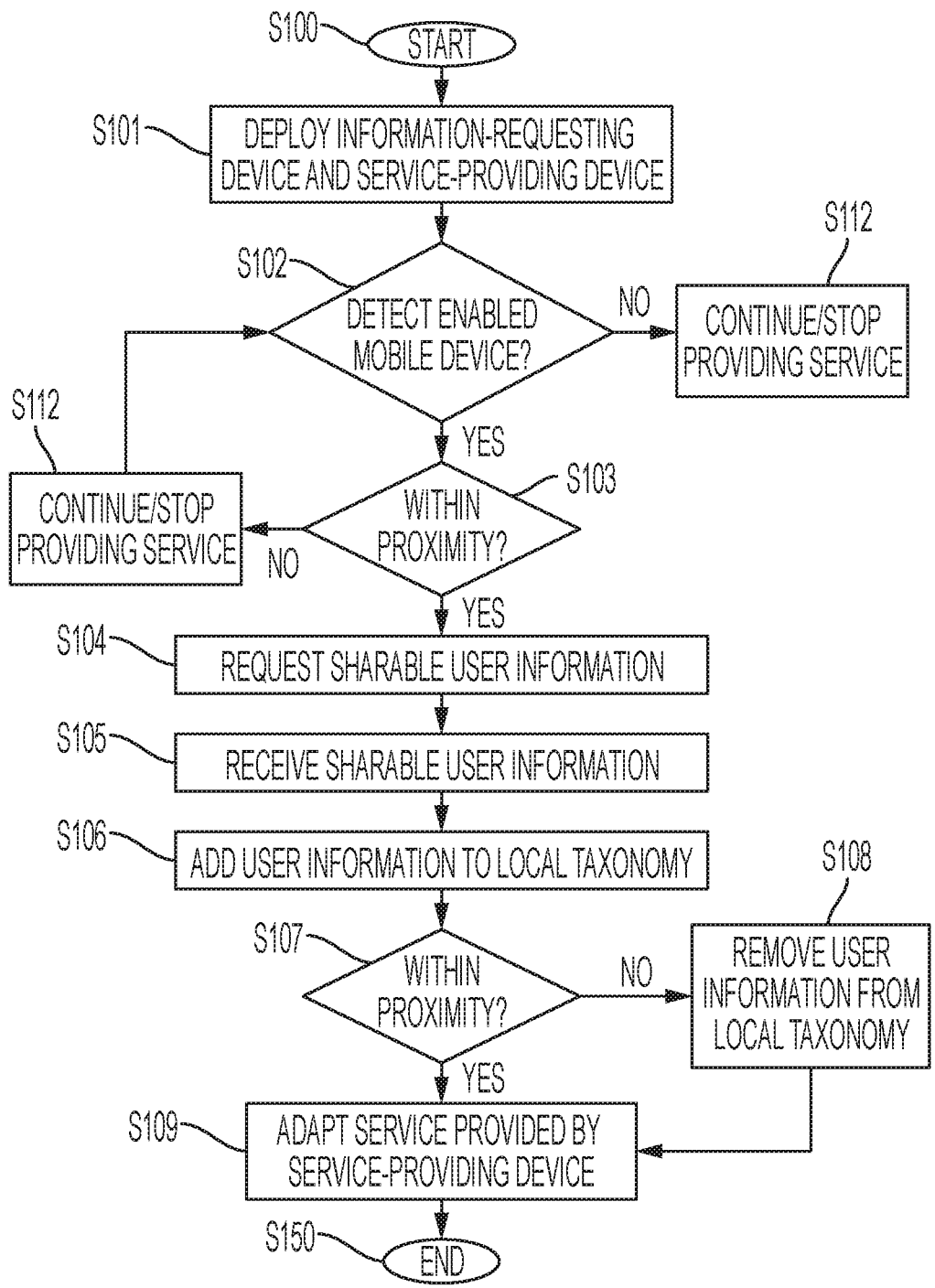
FIG. 4 is a flowchart illustrating a method of adapting the service provided by a service-providing device in accordance with at least one embodiment of the present disclosure.

The various components of the systems described above are now discussed in more detail with reference to FIG. 3. FIG. 3 illustrates a block diagram of a system 300 for dynamically adapting a service provided by a service-providing device. The system 300 includes an information-requesting device 302 having a processor 304, a memory 306, and input/output (I/O) interfaces 308, 310. A controller/bus 312 may operatively connect the processor 304, memory 306, and input/output interfaces 308, 310 together. The memory 306 includes instructions 314 for performing the methods disclosed herein, and the processor 304, in communication with the memory 306, executes the instructions for performing at least a part or all of the methods discussed below. The processor may also control the overall operation of the device 302 and/or system 300. Additionally, the system 300 may include one or more of a PC, such as a desktop, a laptop, palmtop computer, portable digital assistant (PDA), server computer, cellular telephone, table computer, mobile devices, and the like, or combinations thereof.

The memory 306 may represent any type of non-transitory computer readable medium such as random access memory (RAM), read only memory (ROM), magnetic disk or tape, optical disk, flash memory, or holographic memory. In one embodiment, the memory 306 comprises a combination of random access memory and read only memory. In some embodiments, the processor 304 and memory 306 may be combined in a single chip. The input/output (I/O) interfaces 308 allows the device 302 to communicate with other devices via a computer network. The digital processor 304 can be variously embodied, such as by a single-core processor, a dual-core processor (or more generally by a multiple-core processor), a digital processor, and cooperating method coprocessor, a digital controller, or the like.

The term "software," as used herein, is intended to encompass any collection or set of instructions executable by a computer or other digital system so as to configure the computer or other digital system to perform the task that is the intent of the software. The term "software" is intended to encompass such instructions stored in storage mediums such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

In particular embodiments, the information-requesting device 302 can include an input/output interface 308 that is a proximity module 308 capable of detecting and communicating with one or more mobile devices 316 via a close proximity protocol 320 (e.g. Bluetooth low energy). The one or more mobile devices 316 may be located within at least a first proximity to the site that the information-requesting device 302 is located. In some embodiments, the proximity module 308 is capable of detecting one or more mobile devices 316 located within at least a second proximity to the site.

In further embodiments, the software instructions 314 of the information-requesting device 302 includes a request component 322, a local taxonomy generator 326, and an output component 330. The request component 322 can be configured to request and receive sharable user information 324 from the one or more mobile devices 316 via the proximity module 308.

The local taxonomy generator 326 can be configured to generate a local taxonomy 328 based on the sharable user information 324 received from the one or more mobile devices 316. In particular embodiments, the information-requesting device 322 further includes a classification component 336, and the local taxonomy generator 326 generates the local taxonomy 328 after the sharable user information 324 received from the mobile devices 316 is classified into at least one of a plurality of user-information categories. The classification component 336 can be configured to classify at least a portion of the sharable user-information 324 received from the one or more mobile devices 316 based on a master taxonomy 338 defined by a plurality of user-information categories. At least a portion of the sharable user-information 324 received from the one or more mobile devices 316 may be classified by the classification component 336 into at least one of the plurality of user-information categories of the master taxonomy 338. In some embodiments, the plurality of user-information categories defining the master taxonomy 338 can include at least one of: native time zone; music preferences; video preferences; user hobbies; language preferences; temperature preferences; and printer output preferences. In such embodiments, the sharable user-information 324 received from the one or more mobile devices 316 may include at least one of: a native time zone 340; a music playlist 342; the name of a musical artist; an interest or hobby 344; a native language; a genre or type of music; a genre of videos (e.g. horror movies); and other information 346, such as a temperature (e.g. a preferred temperature to sleep in), and print and scan preferences. For example, print and scan preferences may include, without limitation, a color setting (e.g. to print or scan in color, or in grey scale, etc.), a finishing setting (e.g. stapling, hole-punching, etc.), a preferred number of copies (e.g. print multiple copies), and a duplex setting (e.g. double-sided or single-sided).

In particular embodiments, the local taxonomy 328 is defined by a sub-set of the plurality of user-information categories of the master taxonomy 328. For example, if the master taxonomy 328 is defined by 100 user-information categories, the local taxonomy 326 may be defined by user-information 324 (received from the mobile devices 316) that has been categorized into or associated with any number of user-information categories, as defined and/or pre-determined by a central authority). Thus, the local taxonomy generator 326 may generate the local taxonomy 328 based on the sharable user-information 324 classified by the classification component 336 into the at least one of the plurality of user-information categories.

The output component 330 can be configured to output the local taxonomy 328 to a service-providing device 332 via a connection 334.

In preferred embodiments, the system 300 includes the service-providing device 332, which provides a service to at least one of the users associated with the one or more mobile devices 316. A service-providing device 332 may include, for example, an audio device, a visual display device, a heating system, or a cooling system. In more specific embodiments, the service-providing device may be a speaker system, a display screen (e.g. television, monitor, etc.), or an HVAC system. In such embodiments, the service provided may be, for example, the playing of music, the playing of an advertisement, or the temperature regulation for an area (e.g. room, building, etc.).

In preferred embodiments, the service provided by the service-providing device 332 is adapted based on the local taxonomy 328. In other words, the service provided by the service-providing device 332 to at least one of the users associated with the one or more mobile devices 316 located near the site of information-requesting device 302 can be adjusted or modified based on the sharable user-information 324 classified into at least one of the plurality of user-information categories defining the local taxonomy 328.

In further embodiments, the local taxonomy includes sharable user-information 324 received from two or more mobile devices 316 located within a certain distance (i.e. a first proximity) of the site of the information-requesting device 302, and the service provided by the service-providing device 332 to at least one of the users associated with the two or more mobile devices 316 located within the first proximity to the site is adapted based on the combined sharable user-information 324 classified into at least one of the plurality of user-information categories of the local taxonomy 328. For example, if the information-requesting device 302 receives sharable user information 324 that two or more users proximate to the information-requesting device 302 share a common interest in particular sport, that user information may be classified and incorporated into the local taxonomy 328, and the service-providing device 332, which may be a display monitor, may display an advertisement for that sport. In embodiments wherein the one or more mobile devices 316 includes mobile devices 316 located within at least a second proximity to the site of the information-requesting device 302, the service provided by the service-providing device 332 is adapted based on the use information 324 associated with such users.

In still further embodiments, the system 300 includes one or more mobile devices 316 located within at least a first proximity to the site of the information-requesting device 302. Each mobile device 316 can include an information-sharing component 350 capable of communicating with the information-requesting device 302 to send the sharable user information 324 associated with user and the mobile device 316 (including metadata), a processor to implement the information-sharing component 350, and a memory device which stores instructions for implementing the information-sharing component 350. In some embodiments, the information-sharing component 350 includes a unique identifier generator 352 configured to generate a unique identifier 354 associated with the mobile device 316. In further embodiments, the identifier generator 352 generates a new unique identifier 354 each time the mobile device 316 encounters an information-requesting device 302.

The information-sharing component 350 may further include an information privacy component 356 configured to determine whether user information 358 associated with the mobile device 316 is sharable user information 324 or private user information. In other words, the privacy component 356 determines whether the information requested by the information-requesting device 302 should be shared, or if the information should be withheld.

Also disclosed herein are methods for adapting a service provided by a service-providing device based on a local taxonomy. The method beings at S100.

At S101, an information-requesting device 302 and a service-providing device 332 are deployed at a site location. The information-requesting device 302 may begin monitoring the site location area (i.e. at least a first proximity to the area) for mobile devices 316 associated with users entering or exiting the area. The service-providing device may be initialized by performing an initial service.

At S102, one or more mobile devices 316 may be detected by the information-requesting device 302. As described above, the information-requesting device 302 may include a proximity module that is capable of detecting mobile device 316 within at least a first proximity to the site location using a close proximity protocol. If no mobile devices 316 are detected, then the initial service may continue, at step S112, without alteration or may be discontinued until one or more users are detected within at least the first proximity to the site location. If one or more mobile devices 316 are detected, it is determined, at step S103, whether the devices 316 are located within at least a first desirable proximity to the information-requesting device 302 and/or the service-providing device 322. If the detected device 316 is not within a pre-determined range/proximity, then the service provided by the service-providing device 322 may be continued, at step S112, as initialized or may be discontinued until another mobile device is detected and is within range.

At S104, the information-requesting device 302 requests user information from the one or more mobile devices 316 located within at least the first proximity to the site location. In particular embodiments, the device 302 requests certain sharable user information 324, which may be based on one or more user-information categories defined in a master taxonomy 338.

At S105, the sharable user information 324 is received from the one or more mobile devices 316. The information 324 may be a sub-set of the user information 358 associated with the devices 316 (i.e. the devices 316 contain additional information deemed "private" and is not shared). The information 324 may further include metadata associated with the device 316. The system 300 may prompt the user of the one or more mobile devices 316, via an application 350, for additional information or metadata to clarify unknown information or better adapt the service provided by the service-providing device 332.

At S106, a local taxonomy 328 of user information 324 defined by one or more user-information categories (e.g. from the master taxonomy 338) is generated based on the information received 324 from the devices 316.

In further embodiments, at a step S107, an additional proximity check is performed to determine whether the mobile device 316 and the associated user are still within the desired range/proximity to the site location, information-requesting device 302, and/or the service-providing device 332. If the mobile device 316 whose user information 324 was added to the local taxonomy has left the area (e.g. moved from zone 118 to zone 132 as seen in FIG. 1), then the user information may be removed from the local taxonomy 328 of user information at a step S108.

If the user and mobile device 316 are still within the appropriate proximity to the site location, information-requesting device 302, and/or service-providing device 332, then the service provided by the service-providing device 332 is modified and/or adapted, at step S109, based on the local taxonomy 328, as described above.

The methods and associated systems described above may continue (i.e. adapting the local taxonomy 328) for any period of time as the flow of users and mobile devices 316 develops, until ending at a step S150.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A system for dynamically adapting a service based on a local taxonomy, the system comprising:
   an information-requesting device located at a site, the information-requesting device comprising:
      a proximity module capable of detecting and communicating with one or more mobile devices located within at least a first proximity to the site;
      a request component configured to request and receive sharable user information from the one or more mobile devices;
      a local taxonomy generator configured to generate the local taxonomy based on the sharable user-information received from the one or more mobile devices within the first proximity;
      an output component configured to output the local taxonomy to a service-providing device;
      a classification component configured to classify at least a portion of the sharable user-information received from the one or more mobile devices based on a master taxonomy defined by a plurality of user-information categories, wherein the plurality of user-information categories defining the master taxonomy include at least one of: native time zone; music preferences; video preferences; user hobbies; language preferences; temperature preferences; and print and scan preferences;
      a processor which operates the proximity module and implements the request component, the local taxonomy generator, and the output component; and
      a memory device which stores the sharable user-information, the local taxonomy, and instructions for implementing the request component, local taxonomy generator, and output component; and
   the service-providing device which provides the service to at least one of the users associated with the one or more mobile devices located within the first proximity to the site, wherein the service is adapted based the local taxonomy.

2. The system of claim 1, wherein at least a portion of the sharable user-information received from the one or more mobile devices is classified by the classification component into at least one of the plurality of user-information categories.

3. The system of claim 2, wherein the local taxonomy is defined by a sub-set of the plurality of user-information categories of the master taxonomy, and the local taxonomy generator generates the local taxonomy based on the sharable user-information classified by the classification component into the at least one of the plurality of user-information categories.

4. The system of claim 3, wherein the service provided by the service-providing device to the at least one of the users associated with the one or more mobile devices located within the first proximity to the site is adapted based on the sharable user-information classified into at least one of the plurality of user-information categories of the local taxonomy.

5. The system of claim 3, wherein the local taxonomy includes sharable user-information received from two or more mobile devices located within the first proximity to the site.

6. The system of claim 5, wherein the service provided by the service-providing device to the at least one of the users associated with the two or more mobile devices located within the first proximity to the site is adapted based on the sharable user-information classified into at least one of the plurality of user-information categories of the local taxonomy.

7. The system of claim 3, wherein the proximity module is capable of detecting one or more mobile devices located within at least a second proximity to the site, and the local taxonomy generator is configured to generate the local taxonomy based on the sharable user-information received from the one or more mobile devices located within at least the second proximity.

8. The system of claim 7, wherein the service provided by the service-providing device to at least one or more users associated with the one or more mobile devices located within at least the second proximity to the site is adapted based on the sharable user-information classified into at least one of the plurality of user-information categories of the local taxonomy.

9. The system of claim 1, wherein the at least a portion of the sharable user-information received from the one or more mobile devices includes at least one of: a native time zone; a music playlist; an artist; a hobby; a native language; a genre of music; a genre of videos; a temperature; and a print color setting.

10. The system of claim 9, wherein the service-providing device is at least one of: an audio device; a visual display device; a heating system; a cooling system.

11. The system of claim 1, wherein the system further comprises the one or more mobile devices located within the first proximity to the site, each mobile device having an information-sharing component capable of communicating with the information-requesting device to send the sharable user information associated with the mobile device, a processor to implement the information-sharing component, and a memory device which stores instructions for implementing the information-sharing component.

12. The system of claim 11, wherein the information-sharing component comprises a unique identifier generator configured to generate a unique identifier associated with the mobile device.

13. The system of claim 12, wherein the information-sharing component further comprises an information privacy component configured to determine whether user information associated with the mobile device is sharable user information or private user information.

14. The system of claim 1, wherein the service-providing device comprises the information-requesting device.

15. A method for adapting a service provided by a service-providing device based on a local taxonomy, the method comprising:

deploying an information-requesting device and the service-providing device at a site;

detecting one or more mobile devices located within at least a first proximity to the site;

requesting sharable user information from the one or more mobile devices located within at least the first proximity to the site;

receiving sharable user information from at least one of the one or more mobile devices located within at least the first proximity to the site;

generating a local taxonomy of user information based on the sharable user information received from the at least one mobile device; and modifying the service provided by the service-providing device based on the local taxonomy;

wherein the information-requesting device comprises:

a proximity module capable of detecting and communicating with one or more mobile devices located within at least the first proximity to the site;

a request component configured to request and receive sharable user information from the one or more mobile devices;

a local taxonomy generator configured to generate the local taxonomy based on the sharable user-information received from the one or more mobile devices within the first proximity;

an output component configured to output the local taxonomy to the service-providing device;

a classification component configured to classify at least a portion of the sharable user-information received from the one or more mobile devices based on a master taxonomy defined by a plurality of user-information categories, wherein the plurality of user-information categories defining the master taxonomy include at least one of: native time zone; music preferences; video preferences; user hobbies; language preferences; temperature preferences; and print and scan preferences;

a processor which operates the proximity module and implements the request component, the local taxonomy generator, and the output component; and a memory device which stores the sharable user-information, the local taxonomy, and instructions for implementing the request component, local taxonomy generator, and output component.

\* \* \* \* \*